United States Patent Office 3,031,291
Patented Apr. 24, 1962

3,031,291
HERBICIDAL METHOD EMPLOYING HYDRAZINE SALTS OF PHENOXYCARBOXYLIC ACIDS
Bertram De Carle Robinson, Heathmont, Victoria, Kevin Desmond Kirby, Pascoe Vale, Victoria, and Charles Gordon Greenham, Deakin, Australian Capital Territory, Australia, assignors to Imperial Chemical Industries of Australia and New Zealand Limited, Melbourne, Victoria, Australia, a corporation of Victoria, Australia, and Commonwealth Scientific and Industrial Research Organization, East Melbourne, Victoria, Australia, a body corporate of Australia
No Drawing. Filed Oct. 3, 1958, Ser. No. 765,020
Claims priority, application Australia Oct. 8, 1957
5 Claims. (Cl. 71—2.6)

This invention provides new substances which are hydrazine salts of phenoxycarboxylic acids having at least one chlorine substituent in the phenyl nucleus. In addition, at least one methyl substituent may also be present in the phenyl nucleus. Examples of these new substances are the hydrazine salts of known phenoxyacetic and phenoxy butyric acids. In common with other salts of theses acids, the hydrazine derivatives exert a profound effect on the growth of a wide variety of plant species; this effect can be used commercially to control or destroy unwanted vegetation. In many instances however, this control is not complete, probably because the salt that has been used has not been adequately distributed through the plant system. We have found that for some purposes, for example for the destruction of mistletoe (plants belonging to the family Loranthaceae) in eucalypts, the hydrazine salts of the present invention give results that are superior to the results achieved with previously known weed-killers. While we do not wish to be limited to any theory regarding the action of these materials, we consider that the greater effectiveness of the materials provided by the present invention may be due to improved distribution of the chemical in the treated plant.

The present invention also provides a method of producing the said new substances, wherein a phenoxycarboxylic acid, having at least one chlorine substituent in the phenyl nucleus is reacted with hydrazine hydrate.

The following specific examples illustrate the invention:

Example 1

1 mole of 2,4-dichlorophenoxyacetic acid was dissolved under reflux in 1100 ml. aqueous ethyl alcohol containing 30% by volume of the alcohol, and 1 mole of hydrazine hydrate was then added over five minutes with further stirring and refluxing. The reaction product, i.e. the hydrazine salt of 2,4-dichlorophenoxyacetic acid, was cooled, filtered and dried in a vacuum oven, and was obtained in the form of white needles having a melting point between 170.5 deg. C. and 171.5 deg. C.

Analysis (percent by weight): Found—C, 38.06; H, 4.02; N, 11.31. Calculated for $C_8H_{10}O_3N_2Cl_2$—C, 37.95; H, 3.95; N, 11.08. The yield in successive experiments varied between 84% and 96% by weight.

Example 2

A formulation suitable for insertion from a conventional sheep drenching gun in a hole formed in the sapwood of trees was prepared by mixing together 23% weight/volume of the hydrazine salt of 2,4-dichlorophenoxyacetic acid produced as in Example 1, 2% weight/volume of polyvinyl alcohol (78% hydrolyzed low viscosity), 4% weight/volume of Wyoming bentonite and sufficient water to make up 100 volumes. The mixture was ball-milled until the desired particle size was obtained, and mixed with sufficient water to provide a 5% weight/volume acid equivalent suspension, which is suitable for use in a drenching gun. The injection of 20 cubic centimetres of the latter preparation into a hole drilled in the sapwood of a eucalypt 9" in diameter at breast height, i.e. approximately four feet six inches above the "ground" and heavily infested with mistletoes brought about the death of all the mistletoes in two to three months, without any apparent injury to the tree.

Similar results were obtained in other trees, the dose being varied in direct proportion to the square of the trunk diameter at breast height. When the sodium or ammonium or triethanolamine salt of 2,4-dichlorophenoxyacetic acid was used, not all the mistletoes were killed and those that were killed took 6 months or longer to die; moreover in these cases, some of the host trees were injured.

Example 3

In preparing the above formulation it is not necessary to isolate the hydrazine salt. 20% weight/volume of 2,4-dichlorophenoxyacetic acid, 4.5% by volume of hydrazine hydrate and approximately 75% by volume water were reacted together at a temperature near the boiling point of water, the reaction mixture was cooled, 2% weight/volume of polyvinyl alcohol (78% hydrolysed, low viscosity), 4% weight/volume of Wyoming bentonite, and sufficient water to make up 100 volumes were added, and the resultant mixture was ball-milled to yield a suspension suitable for use in a drenching gun.

Example 4

A formulation of the hydrazine salt of 2,4-dichlorophenoxyacetic acid suitable for injection from a conventional grease gun into holes bored in the sapwood of trees was prepared from the following ingredients: 20% weight/volume of 2,4-dichlorophenoxyacetic acid, 2.4% by volume of hydrazine hydrate, 8% weight/volume of potato starch, 5% weight/volume of glycerin, 0.25% weight/volume of sodium pentachlorphenate, and sufficient water to make up to 100 volumes.

The 2,4-dichlorophenoxyacetic acid and hydrazine hydrate were reacted, at a temperature near the boiling point of water, in the greater part of the water, and the glycerin and sodium pentachlorophenate were added. The starch was separately stirred to a slurry with the remainder of the water and added to the mixture with vigorous stirring. The resultant mixture set on cooling.

Example 5

For use as a cover spray, 57.5% by weight of the hydrazine salt of 2,4-dichlorophenoxyacetic acid prepared as in Example 1, 5% by weight of the wetting agent sold under the registered trademark "Lissapol" LS, 0.5% by weight of the dispersing agent sold under the registered trademark "Perminal" BX, and 37% by weight of hydrated calcium silicate were mixed and ground together in the dry state in a hammer mill. The powder so obtained was added to the required amount of water before application from a conventional orchard spraying apparatus.

Example 6

The hydrazine salt of 2,4,5-trichlorophenoxyacetic acid was prepared by the procedure described in Example 1 with the substitution of 2,4,5-trichlorophenoxyacetic acid for 2,4-dichlorophenoxyacetic acid, and was obtained in the form of white needles of melting point between 196 deg. C. and 198 deg. C. in yields varying between 90% and 93% by weight.

Analysis (percent by weight): Found—C, 33.54; H, 3.24; N, 9.75. Calculated for $C_8H_9O_3N_2Cl_3$—C, 33.4; H, 3.13; N, 9.75.

Example 7

For use as a cover spray, 56% weight/volume of the hydrazine salt of 2,4,5-trichlorophenoxyacetic acid prepared as in Example 6, 1% weight/volume of polyvinyl alcohol, 3% weight/volume of Wyoming bentonite, and sufficient water to make up 100 volumes were ball-milled together. The resultant product contained 50% weight/volume acid equivalent, and was diluted to application strength before being sprayed on the foliage of blackberries (*Rubus fruticosus*) from a conventional spraying apparatus. Effective control of the blackberries was thereby achieved.

Example 8

The hydrazine salt of 2,4,6-trichlorophenoxyacetic acid was prepared by the procedure described in Example 1, with the substitution of 2,4,6-trichlorophenoxyacetic acid for the 2,4-dichlorophenoxyacetic acid. The product was obtained in yields of 92% to 93% by weight as colourless needles of melting point between 165 deg. C. and 166 deg. C.

Analysis (percent by weight): Found—C, 33.58; H, 3.24; N, 9.66. Calculated for $C_8H_9O_3N_2Cl_3$—C, 33.4; H, 3.13; N, 9.75.

Example 9

A formulation of the hydrazine salt of 2,4,6-trichlorophenoxyacetic acid suitable for injection from a drenching gun was prepared by mixing in a ball mill 22% weight/volume of 2,4,6-trichlorophenoxyacetic acid, 2.5% weight/volume of hydrazine hydrate, 2% weight/volume of polyvinyl alcohol (78% hydrolysed, low viscosity), 4% weight/volume of Wyoming bentonite, and sufficient water to make up 100 volumes, and diluting the resultant mixture with an equal volume of water.

Example 10

1 mole p-chlorophenoxyacetic acid was dissolved under reflux in 900 ml. of aqueous ethyl alcohol containing 30% by volume of the alcohol, and 1 mole hydrazine hydrate was added over five minutes with further stirring and refluxing. The reaction product was cooled, filtered, dried in a vacuum oven, then recrystallised from absolute ethyl alcohol. The hydrazine salt was obtained as colourless needles of melting point between 143 deg. C. and 145 deg. C., in a yield between 43% and 75% by weight.

Analysis (percent by weight): Found—C, 43.82; H, 5.23; N, 10.30. Calculated $C_8H_{11}O_3N_2Cl$—C, 43.93; H, 5.03; N, 12.82.

Example 11

A formulation for use as a cover spray was prepared by mixing in a ball mill 58.5% weight/volume of the hydrazine salt of p-chlorophenoxyacetic acid prepared as in Example 10, 11% weight/volume of polyvinyl alcohol (78% hydrolysed, low viscosity), 3% weight/volume of Wyoming bentonite, and sufficient water to make 100 volumes. The mixture was diluted to application strength before being sprayed on the foliage of wild mustard (*Sinapsis arvensis* L.) and wild turnip (*Brassica tournefortii* Gouan), providing effective control of these weeds.

Example 12

1 mole of 2-methyl-4-chlorophenoxyacetic acid was dissolved under reflux in 1000 ml. aqueous ethyl alcohol containing 30% by volume of the alcohol, and 1 mole of hydrazine hydrate was then added over five minutes with further stirring and refluxing. The hydrazine salt of 2-methyl-4-chlorophenoxyacetic acid, so formed, was cooled, filtered and dried, in a vacuum oven. It was in the form of colourless needles of melting point between 144 deg. C. and 145 deg. C., and was obtained in yields of 70% to 71% by weight.

Analysis (percent by weight): Found—C, 46.30; H, 5.53; N, 11.88. Calculated for $C_{19}H_{13}O_3N_2Cl$—C, 46.45; H, 5.59; N, 12.04.

Example 13

A formulation for use as a cover spray was prepared by mixing in a ball mill 58.2% weight/volume of the hydrazine salt of 2-methyl-4-chlorophenoxyacetic acid prepared as in Example 12, 1% weight/volume of polyvinyl alcohol (78% hydrolysed, low viscosity), 3% weight/volume of Wyoming bentonite, and sufficient water to make up 100 volumes. This mixture was diluted to application strength before being sprayed on to the foliage of herbaceous weeds, providing effective control of them.

Example 14

1 mole of crude 2,4-dichlorophenoxybutyric acid was dissolved under reflux in 200 ml. aqueous ethyl alcohol containing 50% by volume of the alcohol, and 1 mole of hydrazine hydrate was then added over five minutes with further stirring and refluxing. The hydrazine salt of 2,4-dichlorophenoxybutyric acid, obtained as a reaction product, was cooled, filtered, and dried in a vacuum oven. The product was in the form of colourless needles of melting point 107 deg. C. and was obtained in yields of 90% to 91% by weight.

Analysis (percent by weight): Found C, 42.57; H, 5.00; N, 9.85. Calculated for $C_{10}H_{14}O_3N_2Cl_2$—C, 42.71; H, 4.98; N, 9.96.

Example 15

A cover spray was prepared by mixing in a ball mill 56.5% weight/volume of the hydrazine salt of 2,4-dichlorophenoxybutyric acid as prepared in Example 14, 1% weight/volume of polyvinyl alcohol (78% hydrolysed, low viscosity), 3% weight/volume of Wyoming bentonite, and sufficient water to make up 100 volumes. This mixture was diluted to application strength before being sprayed on the foliage of herbaceous weeds, which were thereby destroyed.

We claim:

1. Method for the destruction of unwanted vegetation which comprises applying to said vegetation a herbicidal amount of an aqueous solution of a herbicidal compound of the formula:

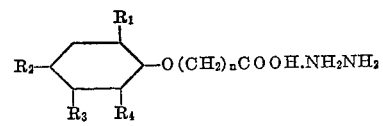

wherein
$R_1$ is selected from the group consisting of H, Cl and $CH_3$,
$R_2$ is chlorine, $n$ is an integer from 1 to 3,
$R_3$ is selected from the group consisting of H and Cl,
$R_4$ is selected from the group consisting of H and Cl.

2. The method of claim 1 in which the herbicidal compound is the hydrazine salt of 2,4-dichlorophenoxyacetic acid.

3. The method of claim 1 in which the herbicidal compound is the hydrazine salt of 2,4-dichlorophenoxybutyric acid.

4. The method of claim 1 in which the herbicidal compound is the hydrazine salt of 2-methyl-4-chlorophenoxyacetic acid.

5. The method of claim 1 in which the herbicidal compound is the hydrazine salt of 2,4,5-trichlorophenoxyacetic acid.

References Cited in the file of this patent

UNITED STATES PATENTS

| | | |
|---|---|---|
| 2,210,874 | Balle et al. | Aug. 13, 1940 |
| 2,390,941 | Jones | Dec. 11, 1945 |
| 2,498,302 | Sexton et al. | Feb. 21, 1950 |

(Other references on following page)

UNITED STATES PATENTS

| | | |
|---|---|---|
| 2,740,810 | Skeeters | Apr. 3, 1956 |
| 2,790,826 | Bader | Apr. 30, 1957 |
| 2,861,876 | Birum | Nov. 25, 1958 |

FOREIGN PATENTS

| | | |
|---|---|---|
| 499,883 | Belgium | June 7, 1951 |
| 155,046 | Australia | Feb. 4, 1954 |
| 739,198 | Great Britain | Oct. 26, 1955 |
| 521,807 | Canada | Feb. 14, 1956 |

OTHER REFERENCES

Thompson et al.: Chem. Absts., vol. 41, pages 3902–3912 (1947).